United States Patent
Scharmüller et al.

(10) Patent No.: US 9,688,110 B2
(45) Date of Patent: Jun. 27, 2017

(54) DRAWBAR

(71) Applicants: Josef Scharmüller, Fornach (AT); Josef Scharmüller, Jr., Fornach (AT)

(72) Inventors: Josef Scharmüller, Fornach (AT); Josef Scharmüller, Jr., Fornach (AT); Christine Scharmüller, Fornach (AT)

(73) Assignees: Josef Scharmüller, Fornach (AT); Josef Scharmüller, Jr., Fornach (AT)

( * ) Notice: Subject to any disclaimer, the term of this patent is extended or adjusted under 35 U.S.C. 154(b) by 0 days.

(21) Appl. No.: 15/033,831

(22) PCT Filed: Nov. 4, 2014

(86) PCT No.: PCT/AT2014/000198
§ 371 (c)(1),
(2) Date: May 2, 2016

(87) PCT Pub. No.: WO2015/061818
PCT Pub. Date: May 7, 2015

(65) Prior Publication Data
US 2016/0311279 A1  Oct. 27, 2016

(30) Foreign Application Priority Data
Nov. 4, 2013 (AT) .................................. A 840/2013

(51) Int. Cl.
*B60D 1/06* (2006.01)
*B60D 1/24* (2006.01)
*B60D 1/28* (2006.01)

(52) U.S. Cl.
CPC ............. *B60D 1/065* (2013.01); *B60D 1/246* (2013.01); *B60D 1/28* (2013.01)

(58) Field of Classification Search
CPC .......... B60D 1/065; B60D 1/246; B60D 1/28; B60D 1/06
See application file for complete search history.

(56) References Cited

U.S. PATENT DOCUMENTS 2,170,980 A * 8/1939 Thorp .................... B60D 1/065
280/512
2,723,866 A   11/1955 Hollingsworth
(Continued)

FOREIGN PATENT DOCUMENTS

| DE | EP 0 806 309 A1 | 11/1997 |
|----|-----------------|---------|
| EP | 0 806 309 A1    | 11/1997 |
| GB | 301 388 A       | 4/1929  |
| GB | 2 175 262 A     | 11/1986 |
| GB | 2 339 180 A     | 1/2000  |

OTHER PUBLICATIONS

International Search Report issued by the European Patent Office in International Application PCT/AT2014/000198.

*Primary Examiner* — Kevin Hurley
*Assistant Examiner* — Michael Stabley
(74) *Attorney, Agent, or Firm* — Henry M. Feiereisen, LLC

(57) ABSTRACT

The invention relates to a drawbar (1) for a vehicle trailer, comprising a half-spherical receiving socket (2) with a receiving opening (3) for receiving a coupling ball (4), and a drawbar carrier (5) for connecting said receiving socket (2) to the vehicle trailer. It is suggested that the receiving socket (2) is pivotally connected to the drawbar carrier (5) using a safety device (6); that the receiving socket (2) can be secured in an operating position using an actuating device (7) of said safety device (6); and that the receiving socket (2) can be pivoted relative to the drawbar carrier (5) in a direction away from the receiving opening (3), out of the operating position and into a decoupling position, by means of said actuating device (7).

15 Claims, 2 Drawing Sheets

(56) References Cited

U.S. PATENT DOCUMENTS

| | | | | |
|---|---|---|---|---|
| 2,855,222 | A * | 10/1958 | Bolmes | B60D 1/065 |
| | | | | 280/512 |
| 3,695,213 | A * | 10/1972 | Littlefield | B60D 1/065 |
| | | | | 116/200 |
| 4,239,252 | A * | 12/1980 | Huetsch | B60T 11/107 |
| | | | | 188/112 R |
| 4,306,734 | A * | 12/1981 | Swanson | B60D 1/32 |
| | | | | 188/112 A |
| 4,657,276 | A * | 4/1987 | Hamerl | B60D 1/065 |
| | | | | 280/477 |
| 5,013,058 | A * | 5/1991 | Kruger | B60B 37/00 |
| | | | | 280/149.2 |
| 5,080,386 | A * | 1/1992 | Lazar | B60D 1/363 |
| | | | | 280/477 |
| 5,213,354 | A * | 5/1993 | Vaughn | B60D 1/40 |
| | | | | 280/477 |
| 5,346,243 | A * | 9/1994 | Boeck | B60D 1/167 |
| | | | | 280/478.1 |
| 5,882,029 | A * | 3/1999 | Kennedy | B60D 1/06 |
| | | | | 280/477 |
| 7,275,754 | B2 | 10/2007 | Scharmüller | |
| 7,547,035 | B2 | 6/2009 | Scharmüller | |
| 7,618,052 | B2 * | 11/2009 | Scharmuller | B60D 1/065 |
| | | | | 280/511 |
| 8,596,665 | B2 | 12/2013 | Scharmüller et al. | |
| 8,690,179 | B2 | 4/2014 | Scharmüller et al. | |
| 2011/0196575 | A1 | 8/2011 | Scharmüller et al. | |
| 2014/0318884 | A1 | 10/2014 | Scharmüller et al. | |

* cited by examiner

DRAWBAR

CROSS-REFERENCES TO RELATED APPLICATIONS

This application is the U.S. National Stage of International Application No. PCT/AT2014/000198, filed Nov. 4, 2014, which designated the United States and has been published as International Publication No. WO 2015/061818 and which claims the priority of Austrian Patent Application, Serial No. A 840/2013, filed Nov. 4, 2013, pursuant to 35 U.S.C. 119(a)-(d).

BACKGROUND OF THE INVENTION

The invention relates to a drawbar for a vehicle trailer.

A drawbar is an apparatus for a drawn vehicle trailer, which is used to couple the vehicle trailer to a tractor vehicle. Drawbars with a semi-spherical receiving socket are especially known, which is provided to accommodate the hitch ball of a tractor vehicle and to thus produce a coupling that can be pivoted easily in all directions. In this case, such ball hitches further comprise a fixable holding-down device which ensures a reliable connection between the receiving socket and the hitch ball. A secure connection between the receiving socket and hitch ball is often also provided when the holding-down device is open because the receiving socket rests with a support weight on the hitch ball. For the purpose of reliably releasing the coupling, it is necessary to manipulate the hitch, especially a removal of the receiving socket from the hitch ball.

It is disadvantageous that in case of a fire on the vehicle trailer access to the hitch is often prevented or can only be accessed under hazard, which is why the hitch cannot be reliably separated. Such a fire can occur during the harvest of especially dry hay or other easily inflammable products. In this case, the fire can spread from the vehicle trailer to the tractor vehicle, as a result of which the entire vehicle combination may go up in flames.

It is therefore the object of the invention to provide a drawbar of the kind mentioned above with which the aforementioned disadvantages can be avoided, and with which the connection between the vehicle trailer and the tractor vehicle can be released reliably even in emergency situations.

SUMMARY OF THE INVENTION

According to one aspect of the invention, the object is achieved by a drawbar for a vehicle trailer, including a semi-spherical receiving socket with a receiving opening for receiving a hitch ball and a drawbar carrier for connecting the receiving socket to the vehicle trailer, wherein the receiving socket is pivotably connected to the drawbar carrier by means of a security apparatus, the receiving socket can be secured in an operating position by means of an actuating device of the security apparatus, and the receiving socket can be pivoted relative to the drawbar carrier by means of the actuating device from the operating position in a direction away from the receiving opening to an unhitching position.

This leads to the advantage that the connection between the vehicle trailer and the tractor vehicle can be separated in a rapid and reliable manner even in an emergency, wherein a reliable separation does not require any operators in the region of the hitch itself. The receiving socket can be brought to a position by the security apparatus in which the hitch ball can slide out of the receiving socket. In this case, the receiving socket has an orientation in the operating position which is conventional for a receiving socket, in which the upper hemisphere of the hitch ball is completely arranged in the receiving socket in the coupled state. When the security apparatus is actuated, the receiving socket is pivoted in a direction opposite the receiving opening, through which the connection is released. Even if the receiving socket still rests on the hitch ball in the decoupling position, e.g. because a downwardly acting force still acts on the drawbar, the receiving socket rests in a tilted manner on the hitch ball in such a way that the hitch ball can slide out of the receiving socket by applying a tensile force in the travelling direction, e.g. by forward movement of the tractor vehicle. The connection can be released reliably even in the case of a load of the drawbar on the hitch ball 4. Furthermore, the hitching and unhitching can be facilitated without a support leg or similar auxiliary means.

The invention further relates to a method for separating a connection between a tractor vehicle and a vehicle trailer.

It is therefore a further object of the invention to provide a method with which the aforementioned disadvantages can be avoided, and with which the connection between the vehicle trailer and the tractor vehicle can be released reliably even in emergency situations.

The advantages of the method correspond to the advantages of the draw bar.

The dependent claims relate to further advantageous embodiments of the invention.

Express reference is hereby made to the wording of the claims, through which the claims are inserted at this point by reference into the description and shall apply as literally represented.

BRIEF DESCRIPTION OF THE DRAWING

The invention will be explained below in closer detail by reference to the enclosed drawings which merely show a preferred embodiment by way of example, wherein.

DETAILED DESCRIPTION OF PREFERRED EMBODIMENTS

Figure 1:
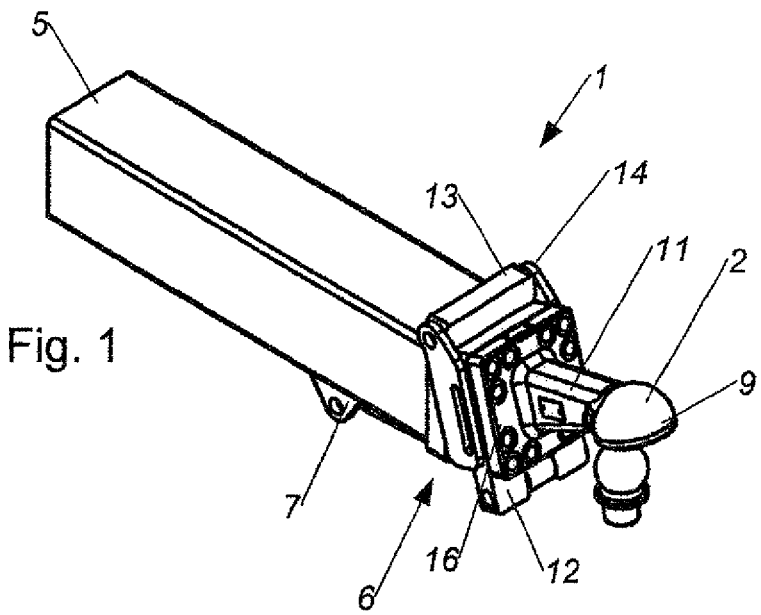
FIG. 1 shows a preferred embodiment of a drawbar in an axonometric view.

FIGS. 1 to 5 show a preferred embodiment of a drawbar 1 for a vehicle trailer, comprising a semi-spherical receiving socket 2 with a receiving opening 3 for accommodating a hitch ball 4 and a drawbar carrier 5 for connecting the receiving socket 2 to the vehicle trailer.

A drawbar 1 is an apparatus which is provided in a drawn vehicle trailer to connect the same to a tractor vehicle, and to transmit the tractive forces from the tractor vehicle to the vehicle trailer.

The drawbar 1 comprises a semi-spherical receiving socket 2, which is also known as a hitch socket. The receiving socket 2 especially preferably comprises a substantially semi-spherical recess, which is provided to accommodate the hitch ball 4 of the tractor vehicle. The receiving socket 2 forms with the edges a receiving opening 3, through which the hitch ball 4 can be introduced into the recess of the receiving socket 2. The recess is bounded by a sliding surface of the receiving socket 2, which in the coupled state is in contact with the hitch ball 4.

It can especially be provided that the receiving socket 2 comprises a cylindrical collar and the receiving socket 2 protrudes with a collar beyond a great circle of the hitch ball 4.

The drawbar 1 further comprises a drawbar carrier 5. The drawbar carrier 5 is a substantially elongated component which connects the receiving socket 2 to the remainder of the vehicle trailer, and which especially conducts the forces from the receiving socket 2 to the remainder of the vehicle trailer. The person skilled in the art has knowledge of a multitude of different drawbar geometries. The drawbar carrier 5 can rigidly be connected to the vehicle trailer in the case of a vehicle trailer with a centrally arranged axle. In the case of a multi-axle vehicle trailer, the drawbar carrier 5 can be movably fixed with a turntable steering to the steering ring of the front axle.

The drawbar carrier 5 can especially be formed as a straight carrier. The drawbar carrier 5 can especially be formed as a drawbar tube. The drawbar carrier 5 can alternatively be shaped in the manner of a triangle or fork.

It is provided that the receiving socket 2 is pivotably connected to the drawbar carrier 5 by means of a security apparatus 6, the receiving socket 2 can be fixed in an operating position by means of an actuating device 7 of the security apparatus 6, and the receiving socket 2 can be pivoted in relation to the drawbar carrier 5 by means of the actuating device 7 from the operating position to an unhitching position facing away from the receiving opening 3. The actuating device 7 can especially be remote-controllable.

A vehicle trailer with this drawbar is further provided.

Furthermore, a vehicle combination can especially be provided with the vehicle trailer and a tractor vehicle with a driver's cab, wherein the actuating device 7 of the security apparatus 6 can be actuated from the driver's cab. An additional operating element can be arranged in the driver's cab which can be coupled to the actuating device 7.

This leads to the advantage that the connection between the vehicle trailer and the tractor vehicle can be separated rapidly and reliably even in an emergency, wherein reliable separation does not require any operating staff in the region of the hitch itself.

The receiving socket 2 can be brought to a position by the security apparatus 6 in which the hitch ball 4 can slide out of the receiving socket 2. In this case, the receiving socket 2 is in an orientation in the operating position which is conventionally provided for a receiving socket 2, in which the upper hemisphere of the hitch ball 4 is completely arranged in the receiving socket 2 in the hitched state.

When the security apparatus 6 is actuated, the receiving socket 2 is pivoted in a direction opposite the receiving opening 3, through which the connection is released. Even if the receiving socket 2 still rests in the unhitching position on the hitch ball 4, e.g. because a downwardly acting force still acts on the drawbar 1, the receiving socket 4 rests on the hitch ball 4 in such a tilted way that the hitch ball 4 can slide out of the receiving socket 2 by applying a tractive force in the travelling direction, e.g. by moving the tractor vehicle. The connection can reliably be released in this case even in the case of a load of the drawbar 1 on the hitch ball 4. Furthermore, the hitching and unhitching can be facilitated without a supporting leg or similar auxiliary means.

Furthermore, a method is provided for separating a connection between a tractor vehicle and a vehicle trailer, wherein the hitch ball 4 of the tractor vehicle is arranged in the receiving opening 3 of the semi-spherical receiving socket 2 of the vehicle trailer in a connected state of the tractor vehicle with the vehicle trailer, which receiving socket 2 is connected to the drawbar carrier 5, wherein the receiving socket 2 is pivoted in relation to the drawbar carrier 5 in a direction facing away from the receiving opening 3 for separating the connection between the tractor vehicle and the vehicle trailer. A tractive force in the travelling direction can be applied to the hitch ball 4 for separation, wherein the hitch ball 4 is able to slide out of the receiving opening 3, even when the receiving socket 2 is pressed onto the hitch ball 4 by the weight of the vehicle trailer. The hitch ball 4 can still be situated in the receiving opening 3 during pivoting, wherein the orientation of the hitch ball 4 to the receiving socket 2 is changed.

The security apparatus 6 is a part of the drawbar 1 and is arranged between the receiving socket 2 and the drawbar carrier 5. The security apparatus 6 comprises an actuating apparatus 7, which is formed to pivot the receiving socket 2 in relation to the drawbar carrier 5 in a predetermined manner between the operating position and the unhitching position. The actuating apparatus 7 can especially be formed in such a way that it can be actuated from the tractor vehicle, especially via electrical, hydraulic or mechanical actuation.

Figure 2:
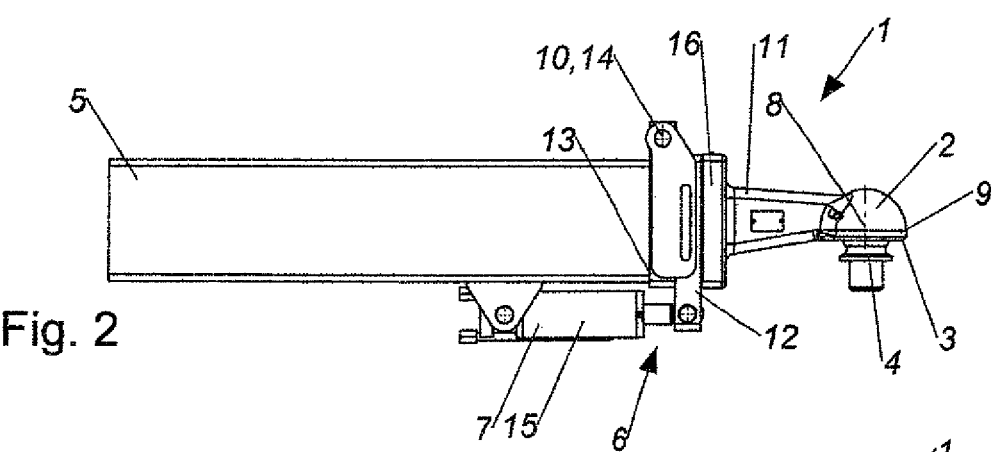
FIG. 2 shows the preferred embodiment of the drawbar in an operating position in a side view.
Figure 4:
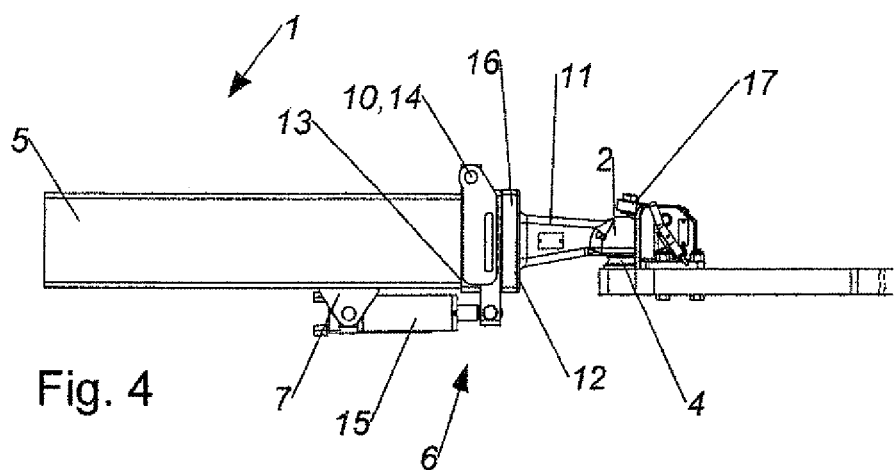
FIG. 4 shows the preferred embodiment of the drawbar and a holding-down device in the operating position in a side view.

The operating position is a position of the receiving socket 2 or the state of the drawbar 1 which is assumed for example during traction of the vehicle trailer by the tractor vehicle. The operating position corresponds to the position between the drawbar carrier 5 and the receiving socket 2, as is conventionally provided in a conventional drawbar 1. It can especially be provided that the receiving opening 3 is arranged horizontally, as seen in the operating position. The operating position is the position in which the vehicle combination consisting of the vehicle trailer and the tractor vehicle is disposed in one plane. In this case, the receiving socket 2 can be oriented in such a way that an upper hemisphere of the hitch ball 4 can be arranged in the receiving socket 2. The actuating device 7 of the security apparatus 6 can especially be formed to hold the receiving socket 2 reliably in the operating position. FIGS. 2 and 4 show the preferred embodiment of the drawbar 1 in the operating position.

Figure 3:
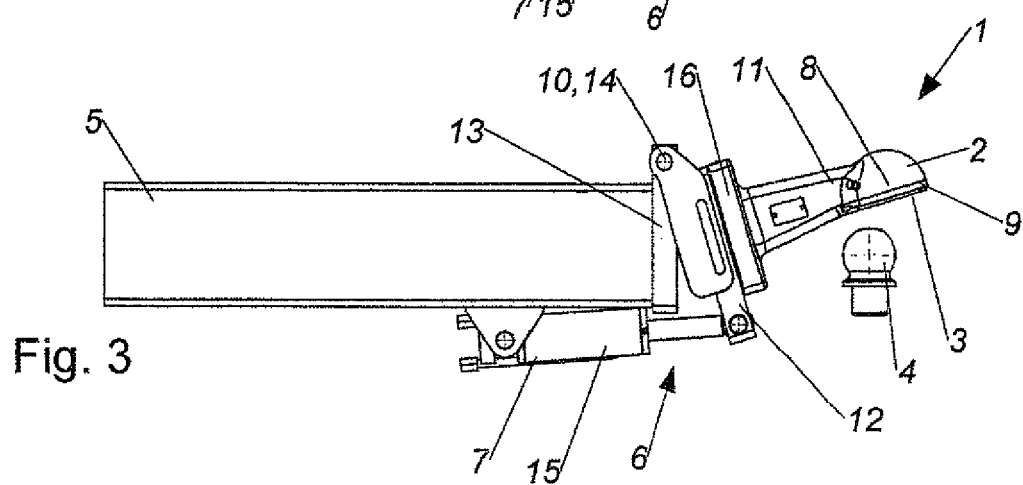
FIG. 3 shows the preferred embodiment of the drawbar in an unhitching position in a side view.
Figure 5:
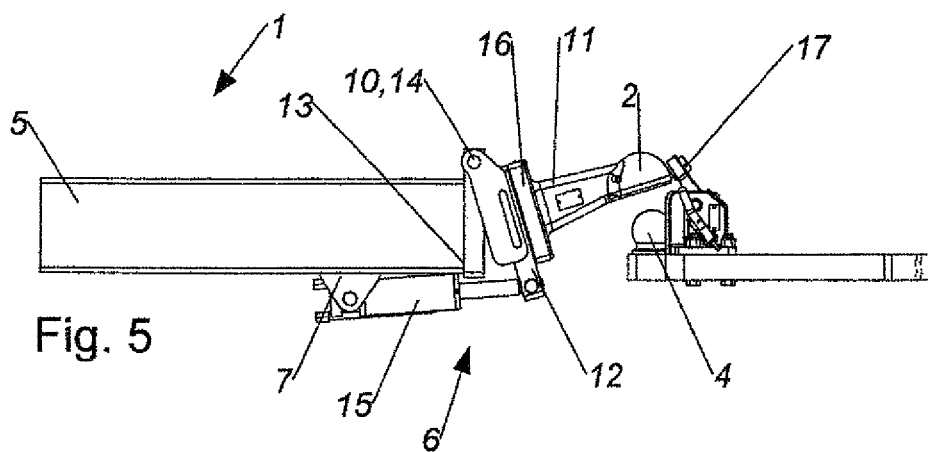
FIG. 5 shows the arrangement of FIG. 4 in the unhitching position in a side view.

The unhitching position is a position of the receiving socket 2 or state of the drawbar 1 in which the connection between the receiving socket 2 and the hitch ball 4 can be separated without an operator in the region of the drawbar 1. In the unhitching position, the receiving socket 2 is pivoted in relation to the drawbar carrier against the operating position in a direction opposite of the receiving opening, i.e. a direction which also leads away from the hitch ball 4, wherein said pivoting can actively be carried out especially by the actuating device 7. FIGS. 1, 3 and 5 show the preferred embodiment of the drawbar 1 in the unhitching position.

It can especially be provided that the tractor vehicle comprises a holding-down device 17. It can be provided in an especially preferred way that the holding-down device 17 can also be actuated from the driver's cab. The holding-down device can especially be remote-controllable.

It can especially be provided that a pivot axis 10 of the security apparatus 6 extends horizontally and transversely to a longitudinal direction of the drawbar carrier 5, as seen in the operating position. The pivot axis 10 of the security apparatus 6 corresponds to the axis along which the receiving socket 2 is pivoted in relation to the drawbar carrier 5. The longitudinal direction of the drawbar carrier 5 corresponds to the intended direction along which the tractive forces act. This corresponds to the longitudinal axis of the drawbar carrier 5 in the case of a straight drawbar carrier 5. In the case of a triangular drawbar carrier 5, this corresponds to a straight line extending through the centre. The longitudinal direction of the drawbar carrier 5 especially corresponds to the straight direction in the case of a vehicle combination travelling in a straight direction.

It can be provided in an especially preferred way that in the operating position a straight line extending parallel to the longitudinal direction of the drawbar carrier 5 and through a central point 8 of the receiving socket 2 intersects a first region 9 of the receiving socket 2 facing away from the drawbar carrier 5, and in the unhitching position said straight line is guided past the first region 9 of the receiving socket 2. The central point 8 of the receiving socket 2 means the point around which the receiving socket 2 can be pivoted around the hitch ball 4, which is therefore also the central point of the hitch ball 4. A part of the receiving socket 2, i.e. this first region 9, is arranged in the operating position, originating from the central point 8 in the direction of the longitudinal direction and away from the vehicle trailer, i.e. in the direction towards the tractor vehicle. In the case of a tractive force of the tractor vehicle on the vehicle trailer along the longitudinal direction of the drawbar carrier 5, said first region 9 is also the region where the hitch ball transmits the tractive force. In the unhitching position, the receiving socket 2 is pivoted in such a way that this region is exposed, as a result of which the hitch ball 4 can slide out of the receiving socket 2 when the tractor vehicle starts to move, even when the receiving socket 2 rests on the hitch ball 4. This may be the case for example when a downward force acts on the drawbar.

It can preferably be provided that a pivot angle between the operating position and the unhitching position is between 10° and 45°, especially between 15° and 30°. It was recognised that reliable unhitching is possible with such a pivot angle.

It can especially be provided that the receiving socket 2 is connected via a web 11 to the security apparatus 6. Space can thus be provided between the security apparatus 6 and the receiving socket 2, as a result of which the security apparatus 6 does not limit the pivoting range of the drawbar 1 in relation to the tractor vehicle. A longitudinal extension of the web 11 can be substantially parallel to the longitudinal direction of the drawbar carrier 5 in the operating position.

It can be provided in an especially preferred way that a distance of the receiving socket 2 from the security apparatus 6, especially preferably from the pivot axis 10 of the security apparatus 6, is 1 to 5 times a diameter of the receiving opening 3. It can further be provided that this distance is one half to ten times the diameter of the receiving opening 3. The diameter of the receiving opening 3 can especially substantially correspond to the diameter of the hitch ball 4. In other words, the receiving socket 2 can thus be arranged especially close to the security apparatus 6 and thus also to the pivot axis 10 of the security apparatus 6. It was recognised that the lever forces acting on the security apparatus 6 can be kept at a low level. The security apparatus 6 can thus be reliably held in the operating position without requiring further complex locking precautions.

It can especially be provided that the security apparatus 6 is integrated in the drawbar carrier 5.

It can preferably be provided that the receiving socket 2 is fastened at least indirectly to a first part 12 of the security apparatus 6, a second part 13 of the security apparatus 6 is fastened to the drawbar carrier 5, and the first part 12 is pivotably connected by means of a pivot joint 14 to the second part 13. The security apparatus 6 therefore comprises two pivotably mutually connected parts 12, 13, which on their part are connected to the drawbar carrier 5 or at least indirectly to the receiving socket 2. The security apparatus 6 can especially be formed as a flap. As a result of this configuration, the security apparatus 6 can be combined easily with existing components of a drawbar 1.

It can especially be provided that the receiving socket 2 is integrally formed on a flange 16 by means of the web 11, wherein said flange can especially represent a component that is already known, and the flange is fastened to the first part 12, especially bolted thereon.

It can alternatively be provided that the web 11 or the flange 16 is welded onto the first part 12.

It can further be provided that the second part 13 is fastened to a generally known drawbar carrier 5, especially bolted or welded thereon.

The first part 12 and/or the second part 13 can especially be formed as plates which are substantially equally large in an especially preferred way.

It can especially be provided that the parts 12, 13 of the security apparatus 6 are connected at one end of the parts 12, 13 to the pivot joint 14, and the actuating device 7 is arranged on an end of the parts 12, 13 which is opposite of said former end. A favourable lever effect with the actuating device 7 can thus be achieved.

It can preferably be provided that the first part 12 rests on the second part 13 over a large area in the operating position. Good transmission of forces of the drawbar 1 in the operating position in the region of the security apparatus 6 can be achieved via the contact surface between the two parts 12, 13, wherein the actuating device 7 can be relieved.

It can especially be provided that the first part 12 and the second part 13 comprise projections and recesses which are diametrically opposed to the projections and engage into each other in the operating position. The actuating device 7 and the pivot joint 14 can thus be relieved in the operating position because shearing forces in particular can be absorbed in the plane of the contact surface of the parts 12, 13 by the projections and the recesses.

It can preferably be provided that the actuating device 7 comprises a hydraulic cylinder 15. The hydraulic cylinder 15 can especially be arranged substantially parallel to the longitudinal direction of the drawbar carrier 5, wherein the hydraulic cylinder 15 can be in a retracted state in the operating position and in an extended state in the unhitching position. A hydraulic cylinder 15 offers the advantage that it can be coupled simply with the hydraulic system of the tractor vehicle, which is usually already present. In this case, the power for actuating the actuating device 7 need not be provided in the region of the security apparatus 6 but can originate from the tractor vehicle, as a result of which the drawbar 1 can be formed in a substantially simpler way.

It can be provided in an especially preferred way that the hydraulic cylinder 15 comprises hydraulic lines which can be coupled at least indirectly to a hydraulic system of the tractor vehicle. The hydraulic cylinder can thus be actuated easily from the tractor vehicle.

It can especially be provided that an operating element is arranged in the driver's cab of the tractor vehicle and the operating element can hydraulically be coupled to the actuating apparatus 7.

It can alternatively be provided that the actuating device 7 comprises an electric motor, e.g. a spindle drive. The actuation can occur electrically from the driver's cab of the tractor vehicle.

The actuating device 7 can especially be connected at one end of the actuating device 7 at least indirectly, and especially in an articulated manner, to the receiving socket 2, and at another end of the actuating device 7 at least indirectly, and especially an articulated manner, to the drawbar carrier 2. At least indirectly means in this case that the respective end is connected to a part in an articulated manner which is fixedly arranged in relation to the receiving socket 2 or the drawbar carrier 2.

It can be provided in an especially preferred manner that the actuating device 7 comprises a securing element, and in a latching position the securing element fixes the receiving socket 2 in the operating position and allows pivoting of the receiving socket 2 in a release position. The receiving socket 2 can be kept in the operating position even in the case of failure of the hydraulic system.

It can be provided in an especially preferred way that the securing element can be actuated by a Bowden cable from the driver's cab of the tractor vehicle. In particular, the tractor vehicle can comprise a coupling apparatus with which the Bowden cable of the securing element can be connected, and which coupling apparatus can be actuated by an operating element from the driver's cab of the tractor vehicle.

The securing element can especially be movably mounted in the direction of the pivot axis 10. The hydraulic cylinder 15 or any other drive can be relieved in the operating position by the securing element.

It can especially be provided that the securing element is a securing pin.

It can be provided that the first part 12 and the second part 13 each comprise a breakthrough, which are in alignment with each other in the operating position. The securing element can penetrate both breakthroughs and thus fix the receiving socket 2 in the operating position. The removal of the securing element from at least one breakthrough allows the pivoting of the receiving socket 2 with respect to the drawbar carrier 5.

It can alternatively be provided that the securing element fixes a piston of the hydraulic cylinder 15.

The invention claimed is:

1. A drawbar for a vehicle trailer, said drawbar comprising:
    a semi-spherical receiving socket having a receiving opening for receiving a hitch ball;
    a drawbar carrier configured to connect the receiving socket to the vehicle trailer; and
    a security apparatus configured to pivotably connect the receiving socket to the drawbar carrier and including an actuating device to secure the receiving socket in an operating position and to pivot the receiving socket in relation to the drawbar carrier from the operating position in a direction away from the receiving opening to an unhitching position, with a straight line extending in the operating position in parallel relationship to a longitudinal direction of the drawbar carrier and extending through a central point of the receiving socket such that the straight line intersects a first region of the receiving socket facing away from the drawbar carrier,
    wherein the receiving socket is spaced from the security apparatus by a distance which is half to ten times a diameter of the receiving opening,
    wherein the straight line extends in the unhitching position past the first region of the receiving socket, and
    wherein the receiving socket has in the unhitching position an orientation which is tilted in relation to the operating position.

2. The drawbar of claim 1, wherein the distance of the receiving socket from the security apparatus is 1 to 5 times the diameter of the receiving opening.

3. The drawbar of claim 1, wherein the receiving socket is pivotable between the operating position and the unhitching position by a pivot angle which ranges between 10° and 45°.

4. The drawbar of claim 1, wherein the receiving socket is pivotable between the operating position and the unhitching position by a pivot angle which ranges between 15° and 30°.

5. The drawbar of claim 1, wherein the security apparatus defines a pivot axis which extends horizontally and transversely to the longitudinal direction of the drawbar carrier, when the receiving socket is in the operating position.

6. The drawbar of claim 1, wherein the receiving socket is connected via a bar to the security apparatus.

7. The drawbar of claim 1, wherein the receiving socket is fastened, at least indirectly, to a first part of the security apparatus, said security apparatus having a second part which is fastened to the drawbar carrier, with the first part being pivotably connected via a pivot joint to the second part.

8. The drawbar of claim 7, wherein the first and second parts of the security apparatus are connected at a first end of the first and second parts to the pivot joint, said actuating device being arranged on the first and second parts at a second end which is opposite of the first end.

9. The drawbar of claim 7, wherein the first part rests on the second part over a large area in the operating position.

10. The drawbar of claim 1, wherein the actuating device comprises a hydraulic cylinder.

11. The drawbar of claim 1, wherein the actuating device comprises a securing element which is configured to fix in the operating position the receiving socket in a latching position, and to allow pivoting of the receiving socket in a release position.

12. The drawbar of claim 11, wherein the actuating device comprises a Bowden cable to actuate the securing element.

13. A vehicle trailer, comprising a drawbar which includes a semi-spherical receiving socket having a receiving opening for receiving a hitch ball, a drawbar carrier configured to connect the receiving socket to the vehicle trailer, and a security apparatus configured to pivotably connect the receiving socket to the drawbar carrier and including an actuating device to secure the receiving socket in an operating position and to pivot the receiving socket in relation to the drawbar carrier from the operating position in a direction away from the receiving opening to an unhitching position, with a straight line extending in the operating position in parallel relationship to a longitudinal direction of the drawbar carrier and extending through a central point of the receiving socket such that the straight line intersects a first region of the receiving socket facing away from the drawbar carrier, wherein the receiving socket is spaced from the security apparatus by a distance which is half to ten times a diameter of the receiving opening, wherein the straight line extends in the unhitching position past the first region of the receiving socket, and wherein the receiving socket has in the unhitching position an orientation which is tilted in relation to the operating position.

14. A vehicle combination, comprising:

a vehicle trailer including a drawbar which comprises a semi-spherical receiving socket having a receiving opening for receiving a hitch ball, a drawbar carrier configured to connect the receiving socket to the vehicle trailer, and a security apparatus configured to pivotably connect the receiving socket to the drawbar carrier and including an actuating device to secure the receiving socket in an operating position and to pivot the receiving socket in relation to the drawbar carrier from the operating position in a direction away from the receiving opening to an unhitching position, with a straight line extending in the operating position in parallel relationship to a longitudinal direction of the drawbar carrier and extending through a central point of the receiving socket such that the straight line intersects a first region of the receiving socket facing away from the drawbar carrier, wherein the receiving socket is spaced from the security apparatus by a distance which is half to ten times a diameter of the receiving opening, wherein the straight line extends in the unhitching position past the first region of the receiving socket, and wherein the receiving socket has in the unhitching position an orientation which is tilted in relation to the operating position; and a tractor vehicle having a driver's cab configured to enable actuation of the actuating device of the security apparatus from the driver's cab.

15. A method for separating a connection between a semi-spherical receiving socket, connected via a drawbar carrier to a vehicle trailer, and a hitch ball of a tractor vehicle received in a receiving opening of a semi-spherical receiving socket, said method comprising:

securing the receiving socket in an operating position by a security apparatus comprising an actuating device, spaced from the receiving socket by a distance which is half to ten times a diameter of the receiving opening, such that a straight line extending in the operating position in parallel relationship to a longitudinal direction of the drawbar carrier and extending through a central point of the receiving socket intersects a first region of the receiving socket facing away from the drawbar carrier; and pivoting the receiving socket via the actuating device to an unhitching position in relation to the drawbar carrier in a direction away from the receiving opening to thereby tilt the receiving socket and allow the hitch ball to slide out of the receiving socket, with the straight line extending in the unhitching position past the first region of the receiving socket.

* * * * *